United States Patent
Liu et al.

(10) Patent No.: US 12,367,542 B2
(45) Date of Patent: Jul. 22, 2025

(54) POINT CLOUD PROCESSING METHOD AND ELECTRONIC DEVICE

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 17/884,684

(22) Filed: Aug. 10, 2022

(65) Prior Publication Data

US 2024/0013341 A1     Jan. 11, 2024

(30) Foreign Application Priority Data

Jul. 6, 2022 (CN) .......................... 202210799006.4

(51) Int. Cl.
  *G06T 3/40*    (2024.01)
  *G06T 17/00*   (2006.01)

(52) U.S. Cl.
  CPC .............. *G06T 3/40* (2013.01); *G06T 17/00* (2013.01); *G06T 2210/36* (2013.01); *G06T 2210/56* (2013.01)

(58) Field of Classification Search
  CPC ....... G06T 3/40; G06T 17/00; G06T 2210/36; G06T 2210/56
  See application file for complete search history.

(56) References Cited

U.S. PATENT DOCUMENTS

| | | | | |
|---|---|---|---|---|
| 5,724,493 | A  * | 3/1998 | Hosoya | G06T 17/00 345/423 |
| 9,633,483 | B1 * | 4/2017 | Xu | G06F 18/24 |
| 11,017,566 | B1 * | 5/2021 | Tourapis | G06T 9/001 |
| 11,288,826 | B1 * | 3/2022 | Lato | G06T 7/254 |
| 11,315,271 | B2 * | 4/2022 | Li | G06V 10/82 |
| 11,403,817 | B1 * | 8/2022 | Eckman | G06F 18/23213 |

(Continued)

OTHER PUBLICATIONS

P. Zhang, X. Wang, L. Ma, S. Wang, S. Kwong and J. Jiang, "Progressive Point Cloud Upsampling via Differentiable Rendering," in IEEE Transactions on Circuits and Systems for Video Technology, vol. 31, No. 12, pp. 4673-4685, Dec. 2021, doi: 10.1109/TCSVT.2021.3100134. (Year: 2021).*

(Continued)

*Primary Examiner* — Charles L Beard
(74) *Attorney, Agent, or Firm* — Ryan, Mason & Lewis, LLP

(57) ABSTRACT

A method in an illustrative embodiment includes: obtaining a first point cloud based on an input point cloud, a point number of the first point cloud being greater than a point number of the input point cloud; obtaining a first group of point clouds based on the first point cloud, the first group of point clouds including a plurality of point clouds; obtaining a second group of point clouds based on the input point cloud and the first group of point clouds, the second group of point clouds including a plurality of point clouds; and obtaining a target point cloud based on the first point cloud and the second group of point clouds, a point number of the target point cloud being greater than the point number of the input point cloud.

18 Claims, 6 Drawing Sheets

(56) References Cited

U.S. PATENT DOCUMENTS

| | | | |
|---|---|---|---|
| 11,704,769 B1* | 7/2023 | Weingartner | G06T 17/005 382/260 |
| 11,748,945 B1* | 9/2023 | Monaghan | G06T 9/007 345/419 |
| 11,756,281 B1* | 9/2023 | Casey | G06T 7/73 345/427 |
| 11,763,471 B1* | 9/2023 | Fang | G06V 10/806 382/106 |
| 11,763,485 B1* | 9/2023 | Chen | G06T 7/73 382/103 |
| 11,900,566 B1* | 2/2024 | Ferrés | G06T 5/70 |
| 11,935,209 B1* | 3/2024 | Barsky | G06T 15/20 |
| 2011/0273442 A1* | 11/2011 | Drost | G06V 10/757 345/419 |
| 2013/0071041 A1* | 3/2013 | Jin | G06T 3/4076 382/254 |
| 2013/0155058 A1* | 6/2013 | Golparvar-Fard | G06Q 10/06311 345/419 |
| 2013/0155199 A1* | 6/2013 | Liu | G06T 7/85 348/47 |
| 2014/0023291 A1* | 1/2014 | Lin | G06T 5/73 382/279 |
| 2014/0098094 A1* | 4/2014 | Neumann | G06V 20/653 345/420 |
| 2014/0192050 A1* | 7/2014 | Qiu | G06V 20/653 345/420 |
| 2017/0132763 A1* | 5/2017 | Salvador Marcos | G06T 5/70 |
| 2017/0193692 A1* | 7/2017 | Huang | G06T 5/70 |
| 2017/0278221 A1* | 9/2017 | Ji | G06F 3/017 |
| 2018/0359486 A1* | 12/2018 | Lai | H04N 19/88 |
| 2019/0087979 A1* | 3/2019 | Mammou | H04N 19/597 |
| 2019/0088004 A1* | 3/2019 | Lucas | G06T 19/20 |
| 2019/0156518 A1* | 5/2019 | Mammou | G06T 19/20 |
| 2019/0311500 A1* | 10/2019 | Mammou | G06T 9/001 |
| 2019/0313110 A1* | 10/2019 | Mammou | G06T 7/248 |
| 2019/0318519 A1* | 10/2019 | Graziosi | G06T 15/20 |
| 2020/0021847 A1* | 1/2020 | Kim | H04N 19/597 |
| 2020/0184604 A1* | 6/2020 | Vosoughi | H04N 19/136 |
| 2020/0219285 A1* | 7/2020 | Faramarzi | H04L 65/70 |
| 2020/0314435 A1* | 10/2020 | Tourapis | G06T 7/74 |
| 2020/0365134 A1* | 11/2020 | Tu | G10L 15/04 |
| 2021/0006833 A1* | 1/2021 | Tourapis | G06T 7/10 |
| 2021/0019918 A1* | 1/2021 | Li | G06T 9/002 |
| 2021/0035352 A1* | 2/2021 | Harviainen | G06T 19/006 |
| 2021/0042501 A1* | 2/2021 | Mao | G06V 20/64 |
| 2021/0049779 A1* | 2/2021 | Harviainen | G06T 19/20 |
| 2021/0049828 A1* | 2/2021 | Park | H04N 19/30 |
| 2021/0090301 A1* | 3/2021 | Mammou | H04N 19/20 |
| 2021/0133463 A1* | 5/2021 | Zheng | G05D 1/0257 |
| 2021/0150726 A1* | 5/2021 | Kao | G06T 7/168 |
| 2021/0192793 A1* | 6/2021 | Engelland-Gay | G06T 3/40 |
| 2021/0211724 A1* | 7/2021 | Kim | H04N 19/46 |
| 2021/0241106 A1* | 8/2021 | Mehr | G06N 3/086 |
| 2021/0279950 A1* | 9/2021 | Phalak | G06F 18/231 |
| 2021/0279951 A1* | 9/2021 | Yoon | G03H 1/0841 |
| 2021/0323572 A1* | 10/2021 | He | G06T 3/14 |
| 2021/0327128 A1* | 10/2021 | Yu | G06T 19/20 |
| 2021/0350147 A1* | 11/2021 | Yuan | G06F 18/23213 |
| 2021/0366082 A1* | 11/2021 | Xiao | G06T 11/00 |
| 2021/0370968 A1* | 12/2021 | Xiao | G01S 7/4808 |
| 2021/0374947 A1* | 12/2021 | Shin | G06V 10/776 |
| 2022/0007037 A1* | 1/2022 | Cai | H04N 19/20 |
| 2022/0012591 A1* | 1/2022 | Dalli | G06N 3/082 |
| 2022/0012945 A1* | 1/2022 | Akhtar | H04N 19/91 |
| 2022/0092802 A1* | 3/2022 | Jang | G06N 3/044 |
| 2022/0122305 A1* | 4/2022 | Smith | G06F 3/04847 |
| 2022/0157014 A1* | 5/2022 | Sevastopolskiy | G06T 7/11 |
| 2022/0164565 A1* | 5/2022 | Li | G06V 20/20 |
| 2022/0189070 A1* | 6/2022 | Rejeb Sfar | G06T 9/002 |
| 2022/0198737 A1* | 6/2022 | Enthed | G06T 19/003 |
| 2022/0222824 A1* | 7/2022 | Usumezbas | G06T 3/40 |
| 2022/0222891 A1* | 7/2022 | Lu | G06T 19/20 |
| 2022/0285009 A1* | 9/2022 | Sha | G06T 3/14 |
| 2022/0292765 A1* | 9/2022 | Le | G06N 3/045 |
| 2022/0300681 A1* | 9/2022 | Ren | G06V 10/23 |
| 2022/0327851 A1* | 10/2022 | Flagg | G06V 30/418 |
| 2022/0351332 A1* | 11/2022 | Jia | G06F 30/23 |
| 2022/0366646 A1* | 11/2022 | Lopez Gavilan | G06T 17/00 |
| 2022/0383640 A1* | 12/2022 | Vora | G06V 10/40 |
| 2022/0413464 A1* | 12/2022 | Zeng | B33Y 50/00 |
| 2023/0019851 A1* | 1/2023 | Yi | G06T 3/4069 |
| 2023/0019972 A1* | 1/2023 | Wang | G06T 3/40 |
| 2023/0027234 A1* | 1/2023 | Wu | G06T 7/194 |
| 2023/0042968 A1* | 2/2023 | Ding | G06T 7/70 |
| 2023/0047211 A1* | 2/2023 | Abuelwafa | G06T 7/64 |
| 2023/0071559 A1* | 3/2023 | Wang | G06T 7/80 |
| 2023/0076092 A1* | 3/2023 | Zhao | G06V 10/72 |
| 2023/0080852 A1* | 3/2023 | Meardi | H04N 19/597 382/232 |
| 2023/0082899 A1* | 3/2023 | Corral-Soto | G06N 3/044 706/21 |
| 2023/0103967 A1* | 4/2023 | Jang | G06T 7/55 382/154 |
| 2023/0114731 A1* | 4/2023 | Sivakumar | G06T 15/205 345/419 |
| 2023/0121534 A1* | 4/2023 | Rukhovich | G06V 10/40 382/103 |
| 2023/0136860 A1* | 5/2023 | Wang | B60W 30/09 345/419 |
| 2023/0141734 A1* | 5/2023 | Zhou | G06N 3/0464 382/173 |
| 2023/0169727 A1* | 6/2023 | Sminchisescu | G06N 3/0455 345/419 |
| 2023/0186476 A1* | 6/2023 | Ghazvinian Zanjani | A61B 5/0088 706/20 |
| 2023/0215088 A1* | 7/2023 | Wang | G06V 20/64 345/419 |
| 2023/0222618 A1* | 7/2023 | Yang | G06T 1/0007 348/222.1 |
| 2023/0230326 A1* | 7/2023 | Hill | G06T 17/00 345/419 |
| 2023/0252662 A1* | 8/2023 | Nikitidis | B29C 64/393 382/103 |
| 2023/0260247 A1* | 8/2023 | Liu | G06V 10/26 382/173 |
| 2023/0260255 A1* | 8/2023 | Tan | G06N 3/0464 382/100 |
| 2023/0281877 A1* | 9/2023 | Corral-Soto | G06T 9/001 382/232 |
| 2023/0298296 A1* | 9/2023 | Wang | G06T 3/08 345/419 |
| 2023/0306557 A1* | 9/2023 | Wang | G06F 18/214 |
| 2023/0368032 A1* | 11/2023 | Eckart | G06N 3/09 |
| 2023/0368468 A1* | 11/2023 | Eckart | G06N 3/0495 |
| 2023/0377160 A1* | 11/2023 | Jain | G06V 10/26 |
| 2023/0377204 A1* | 11/2023 | Guede | G06N 3/045 |
| 2023/0377208 A1* | 11/2023 | Akhtar | G06T 9/40 |
| 2024/0013342 A1* | 1/2024 | Liu | G06N 3/0455 |
| 2024/0013406 A1* | 1/2024 | Chen | G06T 7/62 |
| 2024/0013415 A1* | 1/2024 | Tam | G06T 7/55 |
| 2024/0029207 A1* | 1/2024 | Zhou | G06T 7/73 |
| 2024/0029358 A1* | 1/2024 | Sharma | G06T 17/205 |
| 2024/0037707 A1* | 2/2024 | Shan | G06T 3/40 |
| 2024/0046567 A1* | 2/2024 | Chaudhuri | G06V 10/7553 |
| 2024/0054661 A1* | 2/2024 | Nekkah | G06T 3/60 |
| 2024/0064318 A1* | 2/2024 | Letunovskiy | H04N 19/42 |
| 2024/0096076 A1* | 3/2024 | Zhou | G06V 20/56 |
| 2024/0103607 A1* | 3/2024 | Swain | G06V 40/10 |
| 2024/0119563 A1* | 4/2024 | Liu | G06T 17/00 |
| 2024/0127530 A1* | 4/2024 | Liu | G06T 17/00 |
| 2024/0135489 A1* | 4/2024 | Liu | G06T 3/4053 |
| 2024/0144595 A1* | 5/2024 | Ponjou Tasse | G06V 10/82 |
| 2024/0153107 A1* | 5/2024 | Li | G06T 7/248 |
| 2024/0161478 A1* | 5/2024 | Ma | G06V 10/7715 |
| 2024/0169532 A1* | 5/2024 | Avni | A61C 7/08 |
| 2024/0177353 A1* | 5/2024 | Yuan | G06T 3/4046 |
| 2024/0221353 A1* | 7/2024 | Li | G06T 7/30 |
| 2024/0296528 A1* | 9/2024 | Xiao | G06T 5/60 |
| 2024/0346707 A1* | 10/2024 | Akhtar | G06T 9/002 |
| 2024/0346765 A1* | 10/2024 | Sokolova | G06V 10/761 |

(56) References Cited

U.S. PATENT DOCUMENTS

| | | | |
|---|---|---|---|
| 2025/0069184 A1* | 2/2025 | Ravi Kumar | G01S 17/89 |
| 2025/0095354 A1* | 3/2025 | Ravi Kumar | G06T 5/60 |
| 2025/0131651 A1* | 4/2025 | Miraldo | G06T 17/005 |

OTHER PUBLICATIONS

X. Li, C.-M. Own, K. Wu and Q. Sun, "CM-Net: a point cloud upsampling network based on adversarial neural network," 2021 International Joint Conference on Neural Networks (IJCNN), Shenzhen, China, 2021, pp. 1-8, doi: 10.1109/IJCNN52387.2021.9533464. (Year: 2021).*

J. Yang, C. Lee, P. Ahn, H. Lee, E. Yi and J. Kim, "PBP-Net: Point Projection and Back-Projection Network for 3D Point Cloud Segmentation," 2020 IEEE/RSJ International Conference on Intelligent Robots and Systems (IROS), Las Vegas, NV, USA, 2020, pp. 8469-8475, doi: 10.1109/IROS45743.2020.9341776. (Year: 2020).*

Z.-S. Liu et al., "Image Super-Resolution via Attention based Back Projection Networks," IEEE International Conference on Computer Vision Workshop, arXiv:1910.04476v1, Oct. 10, 2019, 9 pages.

Y. Wang et al., "Dynamic Graph CNN for Learning on Point Clouds," ACM Transaction on Graphics, arXiv:1801.07829v2, Jun. 11, 2019, 13 pages.

W. Yifan et al., "Patch-based Progressive 3D Point Set Upsampling," IEEE Conference on Computer Vision and Pattern Recognition, Jun. 2019, pp. 5958-5967.

L. Yu et al., "PU-Net: Point Cloud Upsampling Network," IEEE Conference on Computer Vision and Pattern Recognition, arXiv:1801.06761v2, Mar. 26, 2018, 15 pages.

R. Li et al., "PU-GAN: A Point Cloud Upsampling Adversarial Network," IEEE International Conference on Computer Vision, Nov. 2019, pp. 7203-7212.

* cited by examiner

POINT CLOUD PROCESSING METHOD AND ELECTRONIC DEVICE

RELATED APPLICATION(S)

The present application claims priority to Chinese Patent Application No. 202210799006.4, filed Jul. 6, 2022, and entitled "Point Cloud Processing Method and Electronic Device," which is incorporated by reference herein in its entirety.

FIELD

Embodiments of the present disclosure relate to the technical field of computers, and more particularly, to a method and an electronic device for point cloud processing.

BACKGROUND

The main way of obtaining information by human beings is vision, and most vision-based application effects depend on image quality. High-resolution images mean that the density of pixels in an image is high and more details can be provided. Therefore, high-resolution images may improve the visual experience of users.

Modeling of three-dimensional (3D) images may be represented by a point cloud. In 3D engineering, data acquisition is performed on a target object according to a measurement instrument (such as a 3D coordinate measuring machine, a 3D laser scanner, or a photographic scanner). For example, an object is scanned through light detection and distance measurement using a laser radar. A potentially massive set of points of target surface characteristics may be obtained. The information that each point can contain includes: Cartesian geometric coordinates (x, y, z), intensity values, classification values (e.g., information reflecting color, surface texture, etc.), and the like, and a data set formed by combining these points is called a point cloud. The point cloud may help to more realistically restore 3D effects of the target object to achieve visualization.

For the same object, the more point data in the sampled point cloud, the better the 3D model obtained. In other words, a denser point cloud may preserve more detailed textures and edges, making the 3D images appear more realistic. However, the point cloud is difficult and expensive to obtain. As the density of the sampled point cloud becomes larger, the required measuring instruments are more expensive, and storage and calculation requirements on the cloud are more burdensome. Images generated according to sparse point clouds are relatively rough and often cannot reflect original details of an object, and as a result users may have a poor visual experience.

SUMMARY

According to an example embodiment of the present disclosure, a point cloud processing solution is provided for increasing the density of sparse point clouds.

In a first aspect of the present disclosure, a point cloud processing method is provided. The method may include: obtaining a first point cloud based on an input point cloud, a point number of the first point cloud being greater than a point number of the input point cloud; obtaining a first group of point clouds based on the first point cloud, the first group of point clouds including a plurality of point clouds; obtaining a second group of point clouds based on the input point cloud and the first group of point clouds, the second group of point clouds including a plurality of point clouds; and obtaining a target point cloud based on the first point cloud and the second group of point clouds, a point number of the target point cloud being greater than the point number of the input point cloud.

By implementing the method provided in the first aspect, the density of sparse point clouds can be increased efficiently, so that a reconstructed 3D model corresponding to point clouds is more accurate and realistic. Furthermore, the acquisition cost of point clouds can be significantly reduced, and the data storage space of point clouds can be reduced.

In some embodiments of the first aspect, obtaining the first point cloud based on the input point cloud includes: generating a feature value of the input point cloud based on coordinates of the input point cloud; obtaining a feature value of the first point cloud based on the feature value of the input point cloud; and generating coordinates of the first point cloud based on the feature value of the first point cloud.

In some embodiments of the first aspect, obtaining the feature value of the first point cloud based on the feature value of the input point cloud includes: upsampling the feature value of the input point cloud to obtain a first feature value; downsampling the first feature value to obtain a second feature value; calculating a difference value between the feature value of the input point cloud and the second feature value to obtain a first residual feature value; upsampling the first residual feature value to obtain a third feature value; and adding the third feature value and the first feature value to obtain the feature value of the first point cloud.

In some embodiments of the first aspect, obtaining the first group of point clouds based on the first point cloud includes: downsampling the first point cloud to obtain the first group of point clouds.

In some embodiments of the first aspect, obtaining the target point cloud based on the first point cloud and the second group of point clouds includes: performing accumulation calculation on coordinates of the first point cloud and coordinates of each of corresponding point clouds in the second group of point clouds to obtain the target point cloud.

In some embodiments of the first aspect, obtaining the second group of point clouds based on the input point cloud and the first group of point clouds includes: obtaining a third group of point clouds based on the input point cloud and the first group of point clouds, the third group of point clouds including a plurality of point clouds; and obtaining the second group of point clouds based on the third group of point clouds, a point number of the second group of point clouds being greater than a point number of the third group of point clouds.

In some embodiments of the first aspect, obtaining the third group of point clouds based on the input point cloud and the first group of point clouds includes: calculating a difference value between coordinates of the input point cloud and coordinates of each of corresponding point clouds in the first group of point clouds respectively to obtain a group of residuals.

In some embodiments of the first aspect, obtaining the second group of point clouds based on the third group of point clouds includes: generating a feature value of each point cloud in the third group of point clouds based on coordinates of each point cloud in the third group of point clouds; obtaining a feature value of each point cloud in the second group of point clouds based on the feature value of each point cloud in the third group of point clouds; and generating coordinates of each point cloud in the second group of point clouds based on the feature value of each point cloud in the second group of point clouds.

In some embodiments of the first aspect, obtaining the feature value of each point cloud in the second group of point clouds based on the feature value of each point cloud in the third group of point clouds includes: upsampling the feature value of each point cloud in the third group of point clouds to obtain a fourth feature value; downsampling the fourth feature value to obtain a fifth feature value; calculating a difference value between the feature value of each point cloud in the third group of point clouds and the fifth feature value to obtain a second residual feature value; upsampling the second residual feature value to obtain a sixth feature value; and adding the sixth feature value and the fourth feature value to obtain the feature value of each point cloud in the second group of point clouds.

In a second aspect of the present disclosure, an electronic device is provided. The electronic device includes: a processor and a memory coupled to the processor. The memory has instructions stored therein which, when executed by the electronic device, cause the electronic device to perform actions including: obtaining a first point cloud based on an input point cloud, a point number of the first point cloud being greater than a point number of the input point cloud; obtaining a first group of point clouds based on the first point cloud, the first group of point clouds including a plurality of point clouds; obtaining a second group of point clouds based on the input point cloud and the first group of point clouds, the second group of point clouds including a plurality of point clouds; and obtaining a target point cloud based on the first point cloud and the second group of point clouds, a point number of the target point cloud being greater than the point number of the input point cloud.

By implementing the electronic device provided in the second aspect, the density of sparse point clouds can be increased efficiently, so that a reconstructed 3D model corresponding to point clouds is more accurate and realistic. Furthermore, the acquisition cost of point clouds can be significantly reduced, and the data storage space of point clouds can be reduced.

In some embodiments of the second aspect, obtaining the first point cloud based on the input point cloud includes: generating a feature value of the input point cloud based on coordinates of the input point cloud; obtaining a feature value of the first point cloud based on the feature value of the input point cloud; and generating coordinates of the first point cloud based on the feature value of the first point cloud.

In some embodiments of the second aspect, obtaining the feature value of the first point cloud based on the feature value of the input point cloud includes: upsampling the feature value of the input point cloud to obtain a first feature value; downsampling the first feature value to obtain a second feature value; calculating a difference value between the feature value of the input point cloud and the second feature value to obtain a first residual feature value; upsampling the first residual feature value to obtain a third feature value; and adding the third feature value and the first feature value to obtain the feature value of the first point cloud.

In some embodiments of the second aspect, obtaining the first group of point clouds based on the first point cloud includes: downsampling the first point cloud to obtain the first group of point clouds.

In some embodiments of the second aspect, obtaining the target point cloud based on the first point cloud and the second group of point clouds includes: performing accumulation calculation on coordinates of the first point cloud and coordinates of each of corresponding point clouds in the second group of point clouds to obtain the target point cloud.

In some embodiments of the second aspect, obtaining the second group of point clouds based on the input point cloud and the first group of point clouds includes: obtaining a third group of point clouds based on the input point cloud and the first group of point clouds, the third group of point clouds including a plurality of point clouds; and obtaining the second group of point clouds based on the third group of point clouds, a point number of the second group of point clouds being greater than a point number of the third group of point clouds.

In some embodiments of the second aspect, obtaining the third group of point clouds based on the input point cloud and the first group of point clouds includes: calculating a difference value between coordinates of the input point cloud and coordinates of each of corresponding point clouds in the first group of point clouds respectively to obtain a group of residuals.

In some embodiments of the second aspect, obtaining the second group of point clouds based on the third group of point clouds includes: generating a feature value of each point cloud in the third group of point clouds based on coordinates of each point cloud in the third group of point clouds; obtaining a feature value of each point cloud in the second group of point clouds based on the feature value of each point cloud in the third group of point clouds; and generating coordinates of each point cloud in the second group of point clouds based on the feature value of each point cloud in the second group of point clouds.

In some embodiments of the second aspect, obtaining the feature value of each point cloud in the second group of point clouds based on the feature value of each point cloud in the third group of point clouds includes: upsampling the feature value of each point cloud in the third group of point clouds to obtain a fourth feature value; downsampling the fourth feature value to obtain a fifth feature value; calculating a difference value between the feature value of each point cloud in the third group of point clouds and the fifth feature value to obtain a second residual feature value; upsampling the second residual feature value to obtain a sixth feature value; and adding the sixth feature value and the fourth feature value to obtain the feature value of each point cloud in the second group of point clouds.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect of the present disclosure.

In a fourth aspect of the present disclosure, a computer-readable storage medium having a computer program stored thereon is provided. The computer program, when executed by a device, causes the device to perform the method according to the first aspect of the present disclosure.

As can be seen from the above description, according to the solutions of various embodiments of the present disclosure, the density of sparse point clouds can be increased efficiently, so that a reconstructed 3D model corresponding to point clouds is more accurate and realistic. Furthermore, the acquisition cost of point clouds can be significantly reduced, and the data storage space of point clouds can be reduced.

It should be understood that this Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In embodiments of the present disclosure, if the number of points in a point cloud is relatively small and the spacing between points is relatively large, the point cloud may be referred to as a sparse point cloud. If the number of points in a point cloud is relatively large and the points are dense, the point cloud may be referred to as a dense point cloud.

The concepts of the sparse point cloud and the dense point cloud are relative, which are usually used for comparative description of different point clouds in the same image.

In order to make a 3D image more vivid and realistic, one processing technique is to upsample a sparse point cloud to obtain a dense point cloud. The idea of point cloud upsampling is to learn multi-level features of each point, use different convolution branches to expand in a feature space, and then decompose the expanded features and reconstruct into an upsampled point cloud set.

In embodiments of the present disclosure, re-sampling of the point cloud may include upsampling and downsampling. The scope of the present disclosure is not limited in terms of the particular algorithms that are used to perform upsampling and downsampling.

Figure 1:
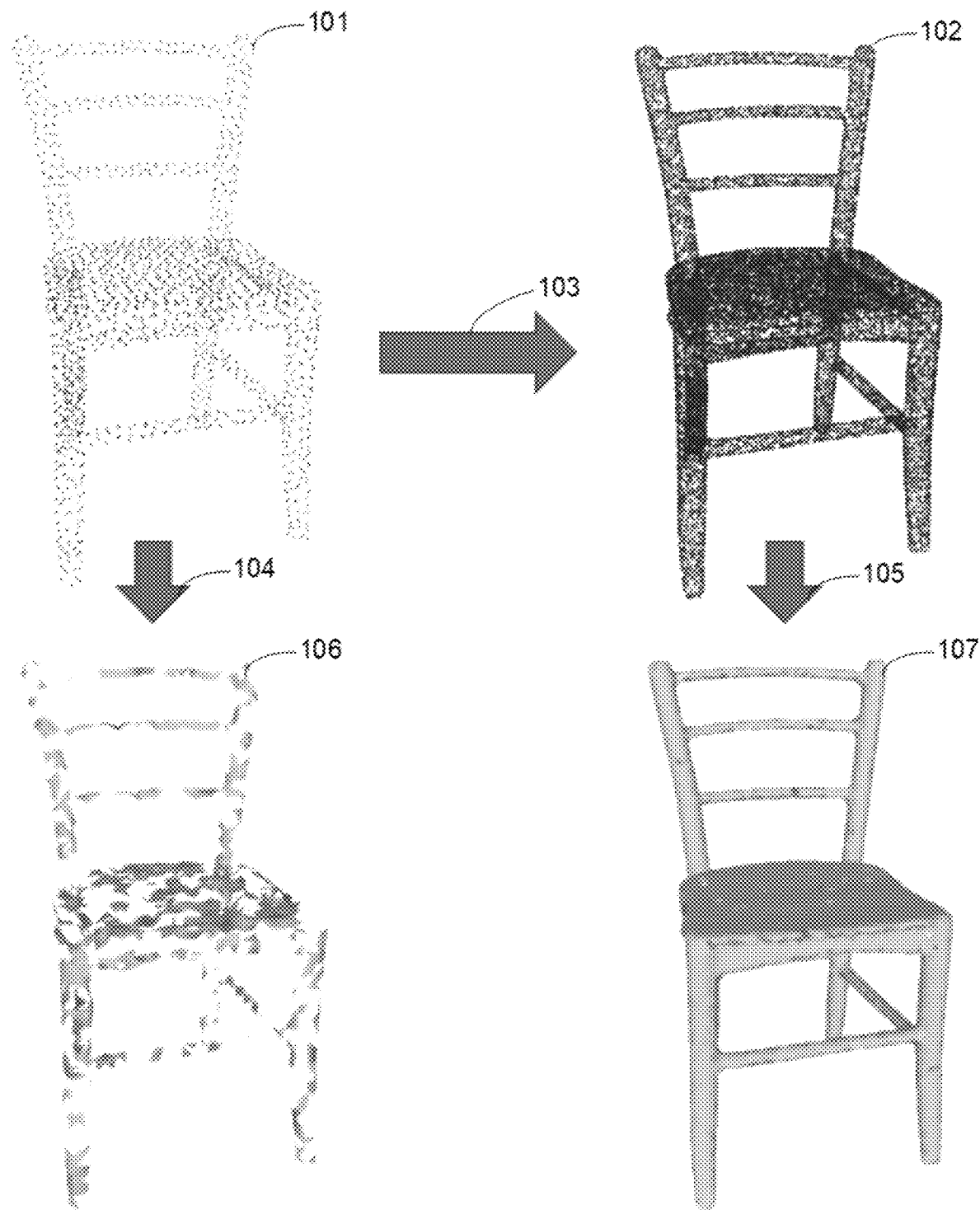
FIG. 1 shows a schematic diagram of a sparse point cloud and a dense point cloud.

FIG. 1 shows a difference between images constructed from a sparse point cloud and a dense point cloud, respectively. Referring to FIG. 1, point cloud acquisition is performed on a chair to obtain sparse point cloud 101 of the chair, and point cloud upsampling 103 is performed on sparse point cloud 101 of the chair to obtain dense point cloud 102 of the chair. For example, sparse point cloud 101 may include 1024 points, and after point cloud upsampling 103, dense point cloud 102 obtained includes 16384 points, such that dense point cloud 102 includes 16 times as many points as sparse point cloud 101. Mesh rendering 104 is performed on sparse point cloud 101 to generate mesh model 106, and mesh rendering 105 is performed on dense point cloud 102 to generate mesh model 107. As can be seen from FIG. 1, mesh model 106 generated using sparse point cloud 101 is relatively coarse, whereas mesh model 107 generated using dense point cloud 102 is relatively more accurate and realistic. Therefore, for the reconstruction of 3D models, increasing the density of sparse point clouds can improve the quality of the 3D models.

Point cloud processing is very important in the field of 3D vision, involving a very large number of related fields, such as automatic driving perception localization, simultaneous localization and mapping (SLAM), 3D scene reconstruction, augmented reality (AR), virtual reality (VR), structure from motion (SFM), attitude estimation, 3D recognition, structured light, stereoscopic vision, 3D measurement, and visual guidance.

Embodiments of the present disclosure provide a point cloud processing method for increasing the density of sparse point clouds, thereby improving the quality of 3D model reconstruction and further significantly reducing the acquisition cost of point clouds. Embodiments of the present disclosure employ a point cloud processing architecture based on a dual back-projection process that may be used to iteratively process point clouds and learn point correlations for upsampling in order to improve the density and accuracy of sparse point clouds. The dual back-projection process according to embodiments of the present disclosure refers to iteratively updating point cloud information using an upsampling-downsampling-upsampling process on a feature domain and a space domain, respectively. Training of a network model in embodiments of the present disclosure may include automatically training a network using a loss function. In addition, an effective training strategy of randomly adding noise into an input point cloud is also provided to ensure the robustness of the network model when processing noise and data outliers.

By implementing the solution provided by embodiments of the present disclosure, the density of sparse point clouds can be increased efficiently, so that a reconstructed 3D model corresponding to point clouds is more accurate and realistic. Furthermore, the acquisition cost of point clouds can be significantly reduced, and the data storage space of point clouds can be reduced. Only a small number of sparse point clouds need to be stored on a device. A dense point cloud may be obtained by performing real-time upsampling on the sparse point clouds using a pre-training model on the device.

Figure 2:
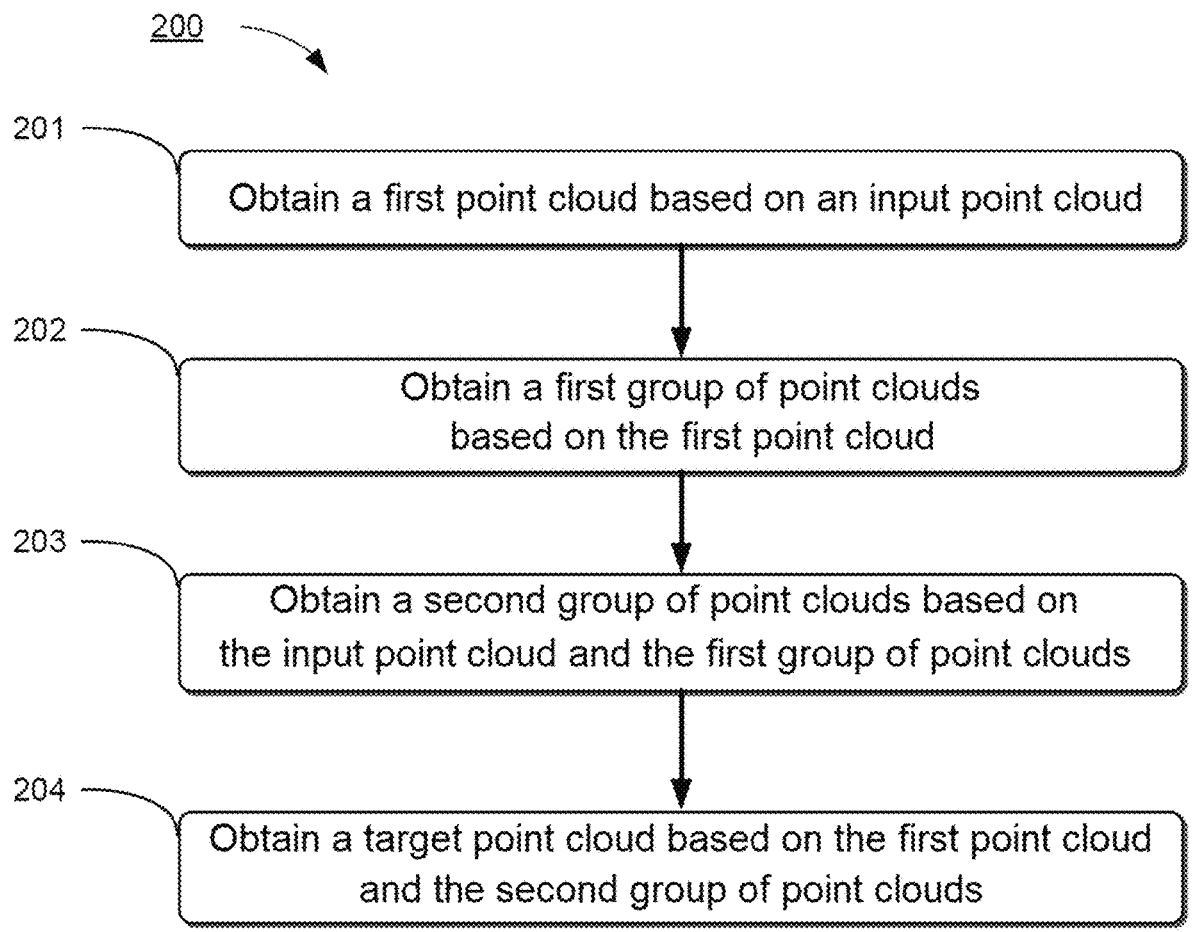
FIG. 2 shows a flow chart of a point cloud processing method according to some embodiments of the present disclosure.

FIG. 2 shows a flow chart of point cloud processing method 200 according to some embodiments of the present disclosure. Method 200 may be applied to an electronic device with processing performance, such as a personal computer (PC), a computer cluster, and a server. Embodiments of the present disclosure do not impose limitations to the device type of the electronic device implementing method 200. It should be understood that, in embodiments of the present disclosure, the subject implementing method 200 may be implemented by an entity device or may be implemented by a plurality of entity devices together. It is to be understood that the subject implementing method 200 may be a logical function module in an entity device, or may be a logical function module composed of a plurality of entity devices. It should be understood that, in embodiments of the present disclosure described below, the various steps of the method provided by embodiments of the present disclosure may be performed by an entity device, or the various steps of the method provided by embodiments of the present disclosure may be performed cooperatively by a plurality of entity devices, and embodiments of the present disclosure do not impose any limitations to this.

It should be understood that method 200 may also include additional blocks that are not shown and/or may omit blocks that are shown, and the scope of the present disclosure is not limited in this regard.

At block 201, a first point cloud is obtained based on an input point cloud. A point number of the first point cloud is greater than a point number of the input point cloud.

In some embodiments, the input point cloud may also be referred to as an original input point cloud, and the first point cloud may also be referred to as an initial output point cloud.

In some embodiments, the input point cloud may include N points and the first point cloud may include kN points, where k and N are positive integers.

In some embodiments, obtaining the first point cloud based on the input point cloud means inputting the input point cloud into a feature-based back-projection module to obtain the first point cloud. As used herein, the feature-based back-projection module, which may also be referred to as a first module, may be a trained feature-based back-projection training model. With reference to an example shown in FIG. 3, original input point cloud 301 is input into feature-based first module 311 for point cloud upsampling to obtain initial output point cloud 302 having kN sampling points, which includes kN×3 pieces of data.

In some embodiments, the first module is for feature processing over a feature domain, so it is necessary to convert point coordinates into point feature values for processing. The specific process of obtaining a first point cloud based on an input point cloud includes: generating a feature value of the input point cloud based on coordinates of the input point cloud; inputting the feature value of the input point cloud into the first module to obtain a feature value of the first point cloud; and generating coordinates of the first point cloud based on the feature value of the first point cloud. Here, with reference to feature-based back-projection module 500 shown in FIG. 5, before N×F original sparse point cloud feature 501 (i.e., the feature value of the input point cloud) is input into feature-based back-projection module 500, the original sparse point cloud coordinate point data N×3 (i.e., the coordinates of the input point cloud) needs to be converted into original sparse point cloud feature data N×F (i.e., the feature value of the input point cloud) used in the feature domain. After N×F original sparse point cloud feature 501 is processed by feature-based back-projection module 500, kN×F target dense point cloud feature 506 (i.e., the feature value of the first point cloud) is output. After feature-based back-projection module 500 outputs kN×F target dense point cloud feature 506 (i.e., the feature value of the first point cloud), the target dense point cloud feature data kN×F (i.e., the feature value of the first point cloud) also needs to be converted into target dense point cloud coordinate point data kN×3 (i.e., the coordinates of the first point cloud) for subsequent point cloud processing.

In some embodiments, the process of processing, by the first module, the feature value of the input point cloud to obtain the feature value of the first point cloud further includes: upsampling the feature value of the input point cloud to obtain a first feature value; downsampling the first feature value to obtain a second feature value; calculating a difference value between the feature value of the input point cloud and the second feature value to obtain a first residual feature value; upsampling the first residual feature value to obtain a third feature value; and adding the third feature value and the first feature value to obtain the feature value of the first point cloud. Here, with reference to feature-based back-projection module 500 shown in FIG. 5, upsampling process 502 is performed on input original sparse point cloud feature N×F (i.e., the feature value of the input point cloud) to obtain k times of an initial dense point cloud feature kN×F (i.e., the first feature value). Next, downsampling process 503 is performed on the initial dense point cloud feature (i.e., the first feature value) to obtain an intermediate sparse point cloud feature (i.e., the second feature value). Then, the intermediate sparse point cloud feature (i.e., the second feature value) is subtracted from the original sparse point cloud feature (i.e., the feature value of the input point cloud), and a residual feature (i.e., the first residual feature value) is obtained as an output. The residual feature (i.e., the first residual feature value) will be subjected to upsampling process 504 again to obtain a residual dense point cloud feature kN×F (i.e., the third feature value). Finally, the residual dense point cloud feature (i.e., the third feature value) is added to the initial dense point cloud feature (i.e., the first feature value), illustratively subject to weighting by weight parameter 505, and kN×F target dense point cloud feature 506 (i.e., the feature value of the first point cloud) is finally output. Weight parameter 505 may be used to adjust and modify feature-based back-projection module 500. The description of the feature-based back-projection module processing the input point cloud to obtain the first point cloud may be further made with reference to the embodiments correspondingly described in FIGS. 5, 6A and 6B below.

At block 202, a first group of point clouds is obtained based on the first point cloud. The first group of point clouds includes a plurality of point clouds.

In some embodiments, the first group of point clouds may be a set of k point clouds including N points.

In some embodiments, the first point cloud may be downsampled to obtain the first group of point clouds. The first group of point clouds may also be referred to as intermediate output point clouds. With reference to the example shown in FIG. 3, initial output point cloud 302 (i.e., the first point cloud) is input into space-based second module 312, point cloud downsampling is performed thereon, and k intermediate output point clouds 303 (i.e., the first group of point clouds) including N sampling points and N×3 pieces of data may be obtained.

At block 203, a second group of point clouds is obtained based on the input point cloud and the first group of point clouds. The second group of point clouds includes a plurality of point clouds.

In some embodiments, the second group of point clouds is a set of k point clouds including kN points.

In some embodiments, a third group of point clouds is obtained based on the input point cloud and the first group of point clouds. The third group of point clouds includes a plurality of point clouds. The second group of point clouds may be obtained based on the third group of point clouds. A point number of the second group of point clouds is greater than a point number of the third group of point clouds.

In some embodiments, the third group of point clouds is a set of k point clouds including N points. The third group of point clouds may also be referred to as point cloud residuals.

In some embodiments, obtaining the third group of point clouds based on the input point cloud and the first group of point clouds may specifically be: calculating a difference value between coordinates of the input point cloud and coordinates of each of corresponding point clouds in the first group of point clouds respectively to obtain a group of residuals. The group of residuals is the third group of point clouds. With reference to the example shown in FIG. 3, coordinate difference calculation is performed on coordinates of original input point cloud 301 (i.e., coordinates of the input point cloud) and coordinates of each intermediate output point cloud 303 in k intermediate output point clouds 303 (i.e., coordinates of each corresponding point cloud in the first group of point clouds) respectively to obtain k point cloud residuals 304 (i.e., the third group of point clouds). Each point cloud residual 304 includes N×3 pieces of data.

In some embodiments, the second group of point clouds may also be referred to as residual output point clouds. Obtaining the second group of point clouds based on the third group of point clouds may specifically be: inputting each point cloud in the third group of point clouds into the feature-based back-projection module to obtain the second group of point clouds. As used herein, the feature-based back-projection module, which may also be referred to as a third module, may be a trained feature-based back-projection training model. With reference to the example shown in FIG. 3, all point cloud residuals 304 (i.e., the third group of point clouds) are respectively input into feature-based third module 313 to perform point cloud upsampling, and k residual output point clouds 305 (i.e., the second group of point clouds) having kN×3 pieces of data are obtained.

In some embodiments, the third module is for feature processing over a feature domain, so it is necessary to convert point coordinates into point feature values for processing. The specific process of respectively inputting each point cloud in the third group of point clouds into the third module to obtain the second group of point clouds includes: generating a feature value of each point cloud in the third group of point clouds based on coordinates of each point cloud in the third group of point clouds; inputting the feature value of each point cloud in the third group of point clouds into the third module to obtain a feature value of each point cloud in the second group of point clouds; and generating coordinates of each point cloud in the second group of point clouds based on the feature value of each point cloud in the second group of point clouds. Here, with reference to feature-based back-projection module 500 shown in FIG. 5, before N×F original sparse point cloud feature 501 (i.e., the feature value of each point cloud in the third group of point clouds) is input into module 500, the original sparse point cloud coordinate point data N×3 (i.e., coordinates of each point cloud in the third group of point clouds) needs to be converted into original sparse point cloud feature data N×F (i.e., the feature value of each point cloud in the third group of point clouds) used in the feature domain. After N×F original sparse point cloud feature 501 is processed by feature-based back-projection module 500, kN×F target dense point cloud feature 506 (i.e., the feature value of each point cloud in the second group of point clouds) is output. After feature-based back-projection module 500 outputs kN×F target dense point cloud feature 506 (i.e., the feature value of each point cloud in the second group of point clouds), the target dense point cloud feature data kN×F (i.e., the feature value of each point cloud in the second group of point clouds) also needs to be converted into target dense point cloud coordinate point data kN×3 (i.e., coordinates of each point cloud in the second group of point clouds) for subsequent point cloud processing.

In some embodiments, the process of processing, by the third module, the feature value of each point cloud in the third group of point clouds to obtain the feature value of each point cloud in the second group of point clouds further includes: upsampling the feature value of each point cloud in the third group of point clouds to obtain a fourth feature value; downsampling the fourth feature value to obtain a fifth feature value; calculating a difference value between the feature value of each point cloud in the third group of point clouds and the fifth feature value to obtain a second residual feature value; upsampling the second residual feature value to obtain a sixth feature value; and adding the sixth feature value and the fourth feature value to obtain the feature value of each point cloud in the second group of point clouds. Here, with reference to feature-based back-projection module 500 shown in FIG. 5, upsampling process 502 is performed on input original sparse point cloud feature N×F (i.e., the feature value of each point cloud in the third group of point clouds) to obtain k times of an initial dense point cloud feature kN×F (i.e., the fourth feature value). Next, downsampling process 503 is performed on the initial dense point cloud feature (i.e., the fourth feature value) to obtain an intermediate sparse point cloud feature (i.e., the fifth feature value). Then, the intermediate sparse point cloud feature (i.e., the fifth feature value) is subtracted from the original sparse point cloud feature (i.e., the feature value of each point cloud in the sixth group of point clouds), and a residual feature (i.e., the second residual feature value) is obtained as an output. The residual feature (i.e., the second residual feature value) will be subjected to upsampling process 504 again to obtain a residual dense point cloud feature kN×F (i.e., the sixth feature value). Finally, the residual dense point cloud feature (i.e., the sixth feature value) is added to the initial dense point cloud feature (i.e., the fourth feature value), illustratively subject to weighting by weight parameter 505, and kN×F target dense point cloud feature 506 (i.e., the feature value of each point cloud in the second group of point clouds) is finally output. Weight parameter 505 may be used to adjust and modify feature-based back-projection module 500. The description of the feature-based back-projection module processing the input point cloud to obtain the first point cloud may be further made with reference to the embodiments correspondingly described in FIGS. 5, 6A and 6B below.

At block 204, a target point cloud is obtained based on the first point cloud and the second group of point clouds. A point number of the target point cloud is greater than a point number of the input point cloud.

In some embodiments, the target point cloud may include kN points. The target point cloud may also be referred to as a target output point cloud or a refined output point cloud.

In some embodiments, obtaining the target point cloud based on the first point cloud and the second group of point clouds may be: performing accumulation calculation on coordinates of the first point cloud and coordinates of each of corresponding point clouds in the second group of point clouds to obtain the target point cloud. With reference to the example shown in FIG. 3, coordinate accumulation calculation is performed on initial output point cloud 302 (i.e., the first point cloud) and all residual output point clouds 305 (i.e., the second group of point clouds) to obtain target output point cloud 306 (i.e., the target point cloud) having kN sampling points and kN×3 pieces of data.

Embodiments of the present application provide method 200 that employs a point cloud processing architecture based on a dual back-projection process for iteratively processing point clouds so as to increase the density of sparse point clouds. The dual back-projection process according to embodiments of the present disclosure refers to iteratively updating point cloud information using an upsampling-downsampling-upsampling process on a feature domain and a space domain, respectively. By implementing method 200, the density of sparse point clouds can be increased efficiently, so that a reconstructed 3D model corresponding to point clouds is more accurate and realistic. Furthermore, the acquisition cost of point clouds can be significantly reduced, and the data storage space of point clouds can be reduced.

Figure 3:
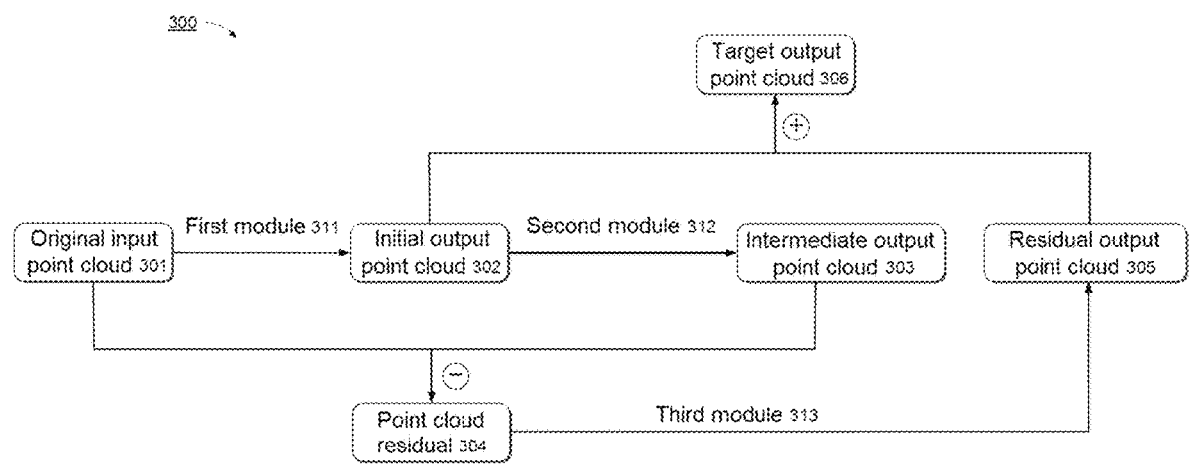
FIG. 3 shows a point cloud upsampling architecture according to some embodiments of the present disclosure.

FIG. 3 shows a schematic diagram of point cloud upsampling architecture 300 provided by an embodiment of the present disclosure. Upsampling architecture 300 shows a dual back-projection process for iteratively processing a point cloud to generate a denser point cloud having kN sampling points from a sparse point cloud having N sampling points, where k is an upsampling factor representing an expansion multiple of the sampling points.

Referring to FIG. 3, upsampling architecture 300 includes trained feature-based first module 311, space-based second module 312, and feature-based third module 313. In some embodiments, feature-based first module 311 may also be referred to as a feature-based back-projection module, space-based second module 312 may also be referred to as a space-based back-projection module, and feature-based third module 313 may also be referred to as a feature-based back-projection module.

As shown in FIG. 3, target output point cloud 306 may be finally generated from original input point cloud 301 using upsampling architecture 300. Original input point cloud 301 is a sparse point cloud having N sampling points, and each sampling point corresponds to 3D coordinate (x, y, z) data. Therefore, original input point cloud 301 includes N×3 pieces of data. Target output point cloud 306 is a dense point cloud having kN sampling points, including kN×3 pieces of data. For ease of understanding herein, some embodiments take each sampling point including the most basic coordinate data as an example for illustration, although each sampling point may include more or less data in other embodiments. For example, it may further include data representing detected color information and material information. The scope of the present disclosure is not limited in this respect.

First, original input point cloud 301 is input into feature-based first module 311 for point cloud upsampling to obtain initial output point cloud 302 having kN sampling points, which includes kN×3 pieces of data. Here, a back-projection method is used to implement an upsampling process of a point cloud domain, which is completed in the feature domain, and may be referred to as feature-based back-projection. For the feature-based back-projection process, reference may be made to the embodiments described below.

Initial output point cloud 302 is then input into space-based second module 312, and is subjected to point cloud downsampling, for example, using a K-nearest neighbor (KNN) algorithm to obtain k intermediate output point clouds 303 including N sampling points and N×3 pieces of data. The KNN algorithm may be used to find k nearest points around a sampling point. Here, a back-projection method is used to implement a downsampling process of a point cloud domain, which is completed in the space domain, may be referred to as space-based back-projection for further updating the upsampling accuracy and improving the visual quality, and may be realized by position distortion minimization.

Then, coordinate subtraction is performed on original input point cloud 301 and k intermediate output point clouds 303 respectively to obtain k point cloud residuals 304. Each point cloud residual includes N×3 pieces of data.

Each point cloud residual 304 is then respectively input into feature-based third module 313 to perform point cloud upsampling, and k residual output point clouds 305 having kN×3 pieces of data are obtained. Here, a back-projection method is used to implement an upsampling process of a point cloud domain, which is completed in the feature domain, and may be referred to as feature-based back-projection. For the feature-based back-projection process, reference may be made to the embodiments described below.

Finally, initial output point cloud 302 and all residual output point clouds 305 are subjected to coordinate addition to obtain target output point cloud 306 having kN sampling points and kN×3 pieces of data. The target output point cloud may also be referred to as a refined output point cloud.

The embodiments described above employ a point cloud processing architecture based on a dual back-projection process for iteratively processing point clouds so as to increase the density of sparse point clouds. The dual back-projection process according to embodiments of the present disclosure refers to iteratively updating point cloud information using an upsampling-downsampling-upsampling process on a feature domain and a space domain, respectively.

By implementing upsampling architecture 300 provided by the present disclosure, the density of sparse point clouds can be increased efficiently, so that a reconstructed 3D model corresponding to point clouds is more accurate and realistic. Furthermore, the acquisition cost of point clouds can be significantly reduced, and the data storage space can be reduced. Only a small number of sparse point clouds need to be stored on a device. A dense point cloud may be obtained by performing real-time upsampling on the sparse point clouds using a pre-training model on the device.

Figure 4A:
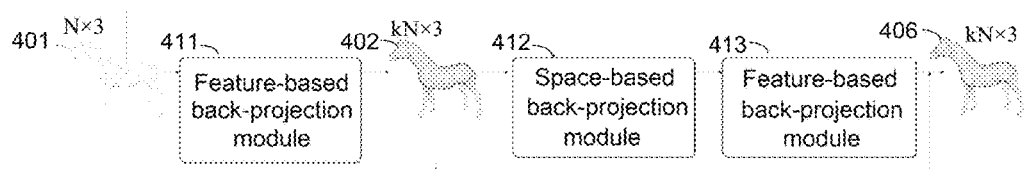
FIG. 4A shows a schematic diagram of a dual back-projection network according to some embodiments of the present disclosure.

FIG. 4A shows an example of processing a point cloud using upsampling architecture 300. Example original input point cloud 401 is a 3D image point cloud of a horse, and original input point cloud 401 includes N×3 pieces of data and is a relatively sparse point cloud. Original input point cloud 401 is input into feature-based back-projection module 411 (i.e., first module 311) for point cloud upsampling to obtain initial output point cloud 402 having kN×3 pieces of sampling data. Initial output point cloud 402 is then input to space-based back-projection module 412 (i.e., second module 312) to perform point cloud downsampling to obtain k intermediate output point clouds having N×3 pieces of sampling data (not shown). Then, coordinate subtraction is performed on original input point cloud 401 and each intermediate output point cloud to obtain k point cloud residuals including N×3 pieces of sampling data. Then, the k point cloud residuals are input into feature-based back-projection module 413 (i.e., third module 313), and point cloud upsampling is performed again to obtain k residual output point clouds having kN×3 pieces of sampling data (not shown). Finally, coordinate addition is performed on initial output point cloud 402 and all residual output point clouds to obtain target output point cloud 406 having kN×3 pieces of sampling data. Target output point cloud 406 is a denser point cloud than original input point cloud 401, and a corresponding 3D image of the horse illustrated is also finer and more realistic.

In embodiments of the present disclosure, downsampling a point cloud including kN points to generate k point clouds having N points may be implemented in space-based back-projection module 412. Then, difference calculation is respectively performed between the k point clouds having N points and original input point cloud 401 to obtain k point cloud residues including N×3 pieces of sampling data. That is, space-based back-projection module 412 includes a downsampling process and a process of taking a difference to obtain a point cloud residual, which are performed in the space domain.

Figure 4B:
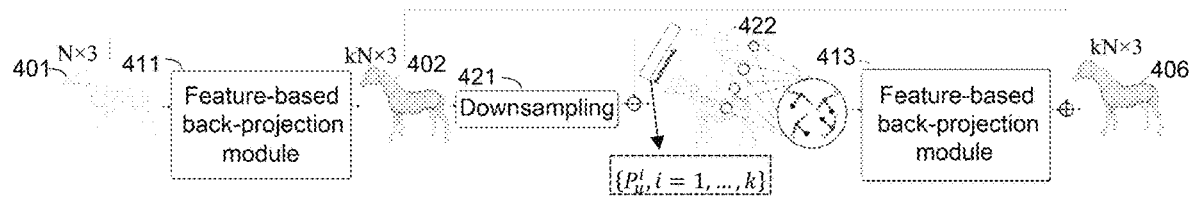
FIG. 4B shows a schematic diagram of a dual back-projection network according to some embodiments of the present disclosure.

Referring to FIG. 4B, space-based back-projection module 412 is shown in detail in FIG. 4B on the basis of FIG. 4A. Space-based back-projection module 412 may be used to minimize space misalignment between points, refine the point cloud space, and align space points, thereby significantly improving the point cloud quality.

As shown in FIG. 4B, the space-based back-projection process is applied to the space domain, including a process for downsampling 421, a process of taking a difference to obtain a point cloud residual, etc.

Similarly, in FIG. 4B, example original input point cloud 401 is a 3D image point cloud of a horse, and original input point cloud 401 includes N×3 pieces of data and is a relatively sparse point cloud. Original input point cloud 401 is input into feature-based back-projection module 411 for performing k times of point cloud upsampling thereon to obtain initial output point cloud 402 having kN×3 pieces of sampling data. After obtaining initial output point cloud 402 including kN points, downsampling 421 may be performed thereon, for example, using the KNN algorithm, to obtain k intermediate output point clouds having N×3 pieces of sampling data (not shown). Then, difference calculation is performed on original input point cloud 401 and each of the k intermediate output point clouds to obtain k residual point clouds 422 including N×3 pieces of sampling data. The k point cloud residuals are then input to feature-based back-projection module 413. That is, k times of point cloud upsampling is performed on each point cloud residual to obtain k residual output point clouds having kN×3 pieces of sampling data (not shown). Finally, coordinates of initial output point cloud 402 and the corresponding coordinates of all residual output point clouds are accumulatively added to obtain target output point cloud 406 having kN×3 pieces of sampling data. Target output point cloud 406 is a denser point cloud than original input point cloud 401, and a corresponding 3D image of the horse illustrated is also finer and more realistic. For the feature-based back-projection process, reference may be made to the embodiments described below.

The above overall back-projection process may be described by the following Formula 1:

$$P_u = G(K(G(P_d)) - P_d) + G(P_d) \quad \text{Formula 1}$$

where $P_d$ is an original sparse point cloud initially input, $P_u$ is a target dense point cloud finally obtained, G represents feature-based back-projection, and K represents the KNN algorithm.

Figure 5:
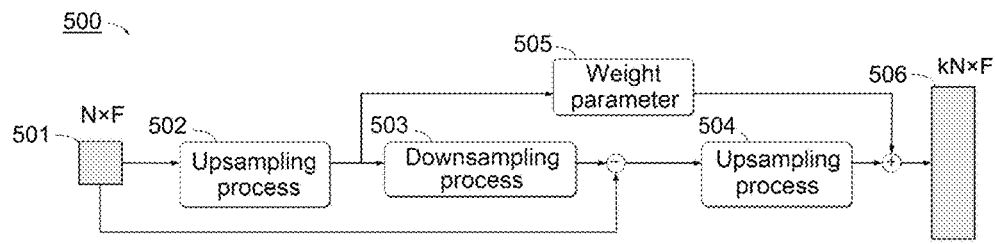
FIG. 5 shows a schematic diagram of a feature-based back-projection module according to some embodiments of the present disclosure.

Feature-based back-projection module 500 in an embodiment of the present disclosure is described below in conjunction with FIG. 5. FIG. 5 shows an architecture of feature-based back-projection module 500.

As shown in FIG. 5, the feature-based back-projection process is applied to a feature domain, including upsampling process 502, downsampling process 503, upsampling process 504, etc. Before N×F original sparse point cloud feature 501 is input into this module, the original sparse point cloud coordinate point data N×3 needs to be converted into original sparse point cloud feature data N×F used in the feature domain. Embodiments of the present disclosure do not impose limitations to the methods used for data conversion. In an example, the original sparse point cloud coordinate point data N×3 is generated into N×F×3 data through the KNN algorithm, and then the N×F×3 data is generated into N×F original sparse point cloud feature data as an input through convolution pooling, such as maximum pooling, average pooling, random pooling, or summing region pooling, so as to ensure the smooth continuity of the data.

In feature-based back-projection module 500, N×F original sparse point cloud feature 501 is taken as an input, where N is the number of point clouds, F is a feature length, and then upsampling process 502 is performed on the input original sparse point cloud feature N×F to obtain k times of an initial dense point cloud feature kN×F. Next, downsampling process 503 is performed on the initial dense point cloud feature to obtain an intermediate sparse point cloud feature. Then, the intermediate sparse point cloud feature is subtracted from the original sparse point cloud feature, and a residual feature is obtained as an output. The residual feature will be subjected to upsampling process 504 again to obtain a residual dense point cloud feature kN×F. Finally, the residual dense point cloud feature is added to the initial dense point cloud feature, illustratively subject to weighting by weight parameter 505, and kN×F target dense point cloud feature 506 is finally output. Weight parameter 505 may be used to adjust and modify feature-based back-projection module 500.

After the module outputs kN×F target dense point cloud feature 506, the target dense point cloud feature data kN×F also needs to be converted into target dense point cloud coordinate point data kN×3 for subsequent point cloud processing. Embodiments of the present disclosure do not impose limitations to the methods used for data conversion. In an example, the target dense point cloud feature data kN×F may be compressed into the target dense point cloud coordinate point data kN×3 by means of inverse convolution, and the inverse convolution may help to eliminate redundant information and extract key features.

The entire feature-based back-projection module 500 may be described by the following Formula 2:

$$F_u = \alpha \times U(D(U(F_d)) - F_d) + U(F_d) \quad \text{Formula 2}$$

where $F_d$ is an original sparse point cloud feature initially input, $F_u$ is a target dense point cloud feature finally obtained, U represents the upsampling process, D represents the downsampling process, and α is a weighting parameter for controlling feature update of the residual dense point cloud.

A suitable parameter α may better correct feature-based back-projection module 500. The value of α may be greater than 1, equal to 1, or less than 1, and the present embodiment does not limit this. Parameters in feature-based back-projection module 500 may be obtained through neural network learning. It should be noted that this upsampling-downsampling-upsampling process is a key concept for the feature-based back-projection module. In particular, residuals between the sparse and dense point clouds are projected back in order to more accurately depict images. The scope of the present disclosure is not limited with respect to particular algorithms used for performing upsampling and downsampling.

Figure 6A:
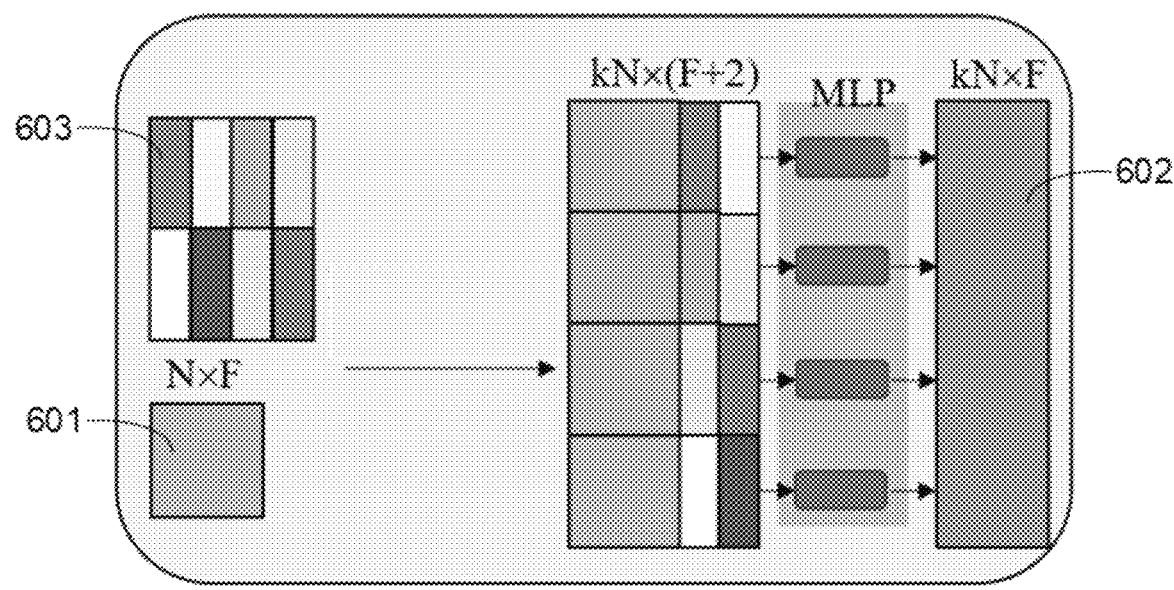
FIG. 6A shows a schematic diagram of a feature-based upsampling process according to some embodiments of the present disclosure.
Figure 6B:
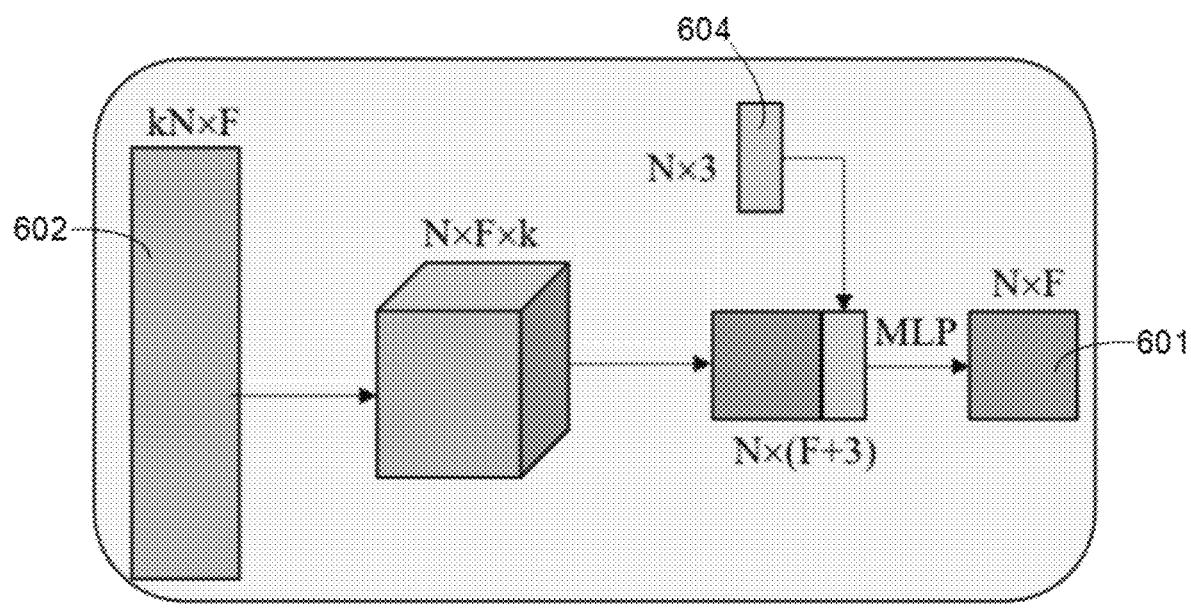
FIG. 6B shows a schematic diagram of a feature-based downsampling process according to some embodiments of the present disclosure.

Referring to FIGS. 6A and 6B, FIG. 6A shows a schematic diagram of details of an upsampling process in feature-based back-projection module 500, and FIG. 6B shows a schematic diagram of details of a downsampling process in feature-based back-projection module 500.

As shown in FIG. 6A, in the upsampling process of some embodiments of the present disclosure, sparse point features 601 (N×F) are first replicated k times as dense point features (kN×F) for upsampling. In embodiments of the present disclosure, kN points may be coded using 2D position mesh 603, and the code may be referred to as a position code used as the mapping of each feature in the upsampling process. The position code and a replication feature are concatenated together as (k+1)N points. Then, a shared multilayer perceptron (MLP) is used to extract feature values, and these point features kN×(F+2) are calculated to generate kN×F. Based on the upsampling process described above, N×F sparse point feature 601 is converted into kN×F dense point feature 602.

As shown in FIG. 6B, in the downsampling process of some embodiments of the present disclosure, kN×F dense point feature 602 is first reshaped into N×F×k, and then the feature N×F×k is mapped down to a feature N×F by conducting a maximum pooling operation on the N×F×k. Original sparse point cloud 604 (N×3) is combined with the feature N×F to obtain a combined feature N×(F+3). The point feature N×(F+3) is then calculated using another MLP to generate N×F. Based on the downsampling process described above, kN×F dense point feature 602 is converted into N×F sparse point feature 601.

Embodiments of the present disclosure include automatically training a network using other loss functions. In addition, in order to better train the network model for point cloud upsampling provided by embodiments of the present disclosure, noise may also be randomly added to the data of the original input point cloud to train the network model for overcoming the influence of noise as much as possible, whereby the trained model may well process the point cloud with noise. Various implementations are possible regarding the form and method of adding noise, and the scope of the present disclosure is not limited in this respect.

By implementing the various embodiments of the present disclosure above, the density of sparse point clouds can be increased efficiently, so that a reconstructed 3D model corresponding to point clouds is more accurate and realistic. Furthermore, the acquisition cost of point clouds can be significantly reduced, and the data storage space of point clouds can be reduced. Only a small number of sparse point clouds need to be stored on a device. A dense point cloud may be obtained by performing real-time upsampling on the sparse point clouds using a pre-training model on the device.

For example, a point cloud of a city size is given, and at least 10,000,000 points are required for point cloud processing. With the technical solution provided by embodiments of the present disclosure, only 6.25% of the points (600,000) may be stored on a device and then upsampled in real time using a pre-trained model on an edge device. In this way, the device may more efficiently provide more services to customers, such as immersive virtual reality and simulation.

Figure 7:
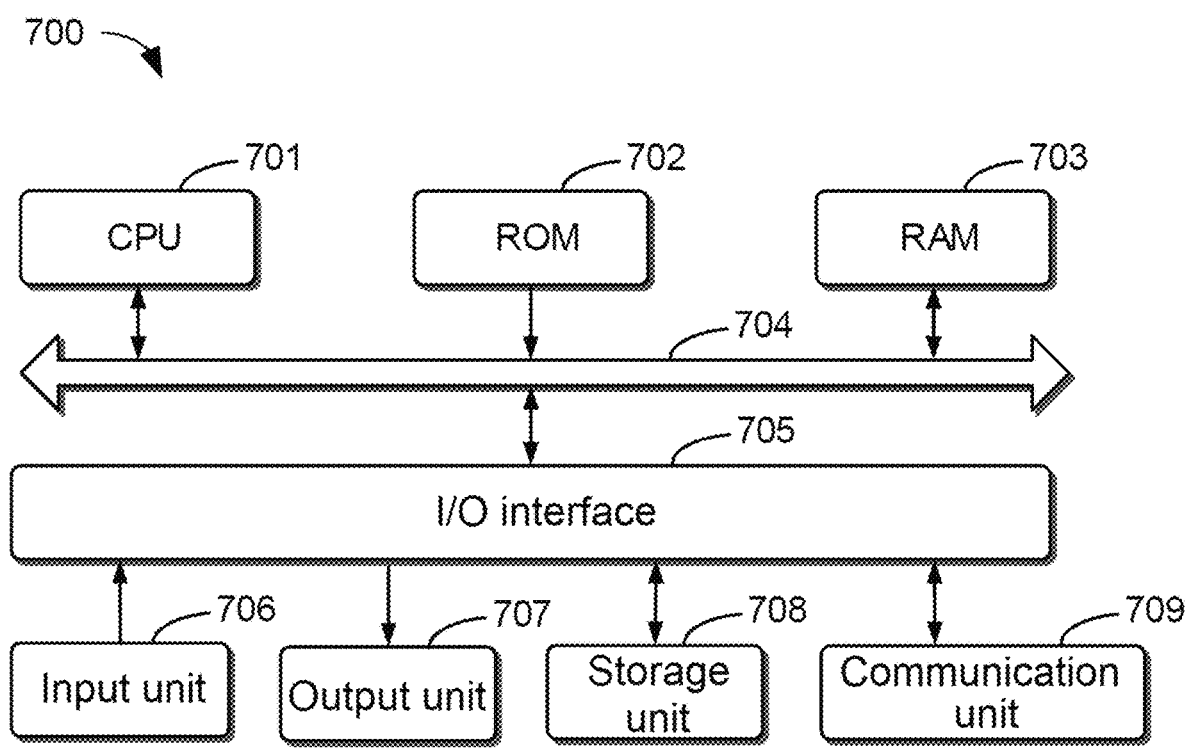
FIG. 7 shows a schematic structural diagram of a device that may be configured to implement embodiments of the present disclosure.

FIG. 7 shows a schematic structural diagram of example device 700 that may be configured to implement some embodiments of the present disclosure. Device 700 may be configured to implement an edge device, a server and/or another type of electronic device as disclosed herein. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network such as the Internet and/or various telecommunication networks.

CPU 701 may execute the various methods and/or processing described above, such as method 200. For example, in some embodiments, method 200 may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded onto RAM 703 and executed by CPU 701, one or more steps of method 200 described above may be performed. Alternatively, in other embodiments, CPU 701 may be configured to perform method 200 in any other suitable manners (e.g., by means of firmware).

The functions described herein above may be performed, at least in part, by one or a plurality of hardware logic components. For example, without limitation, example types of available hardware logic components include: a field programmable gate array (FPGA), an application specific integrated circuit (ASIC), an application specific standard product (ASSP), a system on chip (SOC), a load programmable logic device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A point cloud processing method, comprising:
obtaining a first point cloud based on an input point cloud, a point number of the first point cloud being greater than a point number of the input point cloud;
obtaining a first group of point clouds based on the first point cloud, the first group of point clouds comprising a plurality of point clouds;
obtaining a second group of point clouds based on the input point cloud and the first group of point clouds, the second group of point clouds comprising a plurality of point clouds; and
obtaining a target point cloud based on the first point cloud and the second group of point clouds, a point number of the target point cloud being greater than the point number of the input point cloud;
wherein obtaining the second group of point clouds based on the input point cloud and the first group of point clouds comprises:
obtaining at least one additional group of point clouds based on the input point cloud and the first group of point clouds, the at least one additional group of point clouds comprising a plurality of point clouds; and
obtaining the second group of point clouds based on the at least one additional group of point clouds;
wherein the at least one additional group of point clouds comprises a third group of point clouds, a point number of the second group of point clouds being greater than a point number of the third group of point clouds.

2. The method according to claim 1, wherein obtaining the first point cloud based on the input point cloud comprises:
generating a feature value of the input point cloud based on coordinates of the input point cloud;
obtaining a feature value of the first point cloud based on the feature value of the input point cloud; and
generating coordinates of the first point cloud based on the feature value of the first point cloud.

3. The method according to claim 2, wherein obtaining the feature value of the first point cloud based on the feature value of the input point cloud comprises:
upsampling the feature value of the input point cloud to obtain a first feature value;
downsampling the first feature value to obtain a second feature value;
calculating a difference value between the feature value of the input point cloud and the second feature value to obtain a first residual feature value;
upsampling the first residual feature value to obtain a third feature value; and
adding the third feature value and the first feature value to obtain the feature value of the first point cloud.

4. The method according to claim 1, wherein obtaining the first group of point clouds based on the first point cloud comprises:
downsampling the first point cloud to obtain the first group of point clouds.

5. The method according to claim 1, wherein obtaining the target point cloud based on the first point cloud and the second group of point clouds comprises:
performing accumulation calculation on coordinates of the first point cloud and coordinates of each of corresponding point clouds in the second group of point clouds to obtain the target point cloud.

6. The method according to claim 1, wherein obtaining the third group of point clouds based on the input point cloud and the first group of point clouds comprises:
calculating a difference value between coordinates of the input point cloud and coordinates of each of corresponding point clouds in the first group of point clouds respectively to obtain a group of residuals.

7. The method according to claim 1, wherein obtaining the second group of point clouds based on the third group of point clouds comprises:
generating a feature value of each point cloud in the third group of point clouds based on coordinates of each point cloud in the third group of point clouds;
obtaining a feature value of each point cloud in the second group of point clouds based on the feature value of each point cloud in the third group of point clouds; and
generating coordinates of each point cloud in the second group of point clouds based on the feature value of each point cloud in the second group of point clouds.

8. The method according to claim 7, wherein obtaining the feature value of each point cloud in the second group of point clouds based on the feature value of each point cloud in the third group of point clouds comprises:
upsampling the feature value of each point cloud in the third group of point clouds to obtain a fourth feature value;
downsampling the fourth feature value to obtain a fifth feature value;
calculating a difference value between the feature value of each point cloud in the third group of point clouds and the fifth feature value to obtain a second residual feature value;
upsampling the second residual feature value to obtain a sixth feature value; and
adding the sixth feature value and the fourth feature value to obtain the feature value of each point cloud in the second group of point clouds.

9. An electronic device for point cloud processing, comprising:
at least one processor; and
memory coupled to the at least one processor and having instructions stored therein, wherein the instructions, when executed by the at least one processor, cause the electronic device to perform actions comprising:
obtaining a first point cloud based on an input point cloud, a point number of the first point cloud being greater than a point number of the input point cloud;
obtaining a first group of point clouds based on the first point cloud, the first group of point clouds comprising a plurality of point clouds;
obtaining a second group of point clouds based on the input point cloud and the first group of point clouds, the second group of point clouds comprising a plurality of point clouds; and
obtaining a target point cloud based on the first point cloud and the second group of point clouds, a point number of the target point cloud being greater than the point number of the input point cloud;
wherein obtaining the second group of point clouds based on the input point cloud and the first group of point clouds comprises:
obtaining at least one additional group of point clouds based on the input point cloud and the first group of point clouds, the at least one additional group of point clouds comprising a plurality of point clouds; and obtaining the second group of point clouds based on the at least one additional group of point clouds;
wherein the at least one additional group of point clouds comprises a third group of point clouds, a point number of the second group of point clouds being greater than a point number of the third group of point clouds.

10. The electronic device according to claim 9, wherein obtaining the first point cloud based on the input point cloud comprises:
generating a feature value of the input point cloud based on coordinates of the input point cloud;
obtaining a feature value of the first point cloud based on the feature value of the input point cloud; and
generating coordinates of the first point cloud based on the feature value of the first point cloud.

11. The electronic device according to claim 10, wherein obtaining the feature value of the first point cloud based on the feature value of the input point cloud comprises:
upsampling the feature value of the input point cloud to obtain a first feature value;
downsampling the first feature value to obtain a second feature value;
calculating a difference value between the feature value of the input point cloud and the second feature value to obtain a first residual feature value;
upsampling the first residual feature value to obtain a third feature value; and
adding the third feature value and the first feature value to obtain the feature value of the first point cloud.

12. The electronic device according to claim 9, wherein obtaining the first group of point clouds based on the first point cloud comprises:
downsampling the first point cloud to obtain the first group of point clouds.

13. The electronic device according to claim 9, wherein obtaining the target point cloud based on the first point cloud and the second group of point clouds comprises:
performing accumulation calculation on coordinates of the first point cloud and coordinates of each of corresponding point clouds in the second group of point clouds to obtain the target point cloud.

14. The electronic device according to claim 9, wherein obtaining the third group of point clouds based on the input point cloud and the first group of point clouds comprises:
calculating a difference value between coordinates of the input point cloud and coordinates of each of corresponding point clouds in the first group of point clouds respectively to obtain a group of residuals.

15. The electronic device according to claim 9, wherein obtaining the second group of point clouds based on the third group of point clouds comprises:
generating a feature value of each point cloud in the third group of point clouds based on coordinates of each point cloud in the third group of point clouds;
obtaining a feature value of each point cloud in the second group of point clouds based on the feature value of each point cloud in the third group of point clouds; and
generating coordinates of each point cloud in the second group of point clouds based on the feature value of each point cloud in the second group of point clouds.

16. The electronic device according to claim 15, wherein obtaining the feature value of each point cloud in the second group of point clouds based on the feature value of each point cloud in the third group of point clouds comprises:
upsampling the feature value of each point cloud in the third group of point clouds to obtain a fourth feature value;
downsampling the fourth feature value to obtain a fifth feature value;
calculating a difference value between the feature value of each point cloud in the third group of point clouds and the fifth feature value to obtain a second residual feature value;
upsampling the second residual feature value to obtain a sixth feature value; and
adding the sixth feature value and the fourth feature value to obtain the feature value of each point cloud in the second group of point clouds.

17. A computer program product tangibly stored on a non-transitory computer-readable medium and comprising machine-executable instructions, wherein the machine-executable instructions, when executed by a machine, cause the machine to perform actions comprising:
obtaining a first point cloud based on an input point cloud, a point number of the first point cloud being greater than a point number of the input point cloud;
obtaining a first group of point clouds based on the first point cloud, the first group of point clouds comprising a plurality of point clouds;
obtaining a second group of point clouds based on the input point cloud and the first group of point clouds, the second group of point clouds comprising a plurality of point clouds; and
obtaining a target point cloud based on the first point cloud and the second group of point clouds, a point number of the target point cloud being greater than the point number of the input point cloud;
wherein obtaining the second group of point clouds based on the input point cloud and the first group of point clouds comprises:
obtaining at least one additional group of point clouds based on the input point cloud and the first group of point clouds, the at least one additional group of point clouds comprising a plurality of point clouds; and
obtaining the second group of point clouds based on the at least one additional group of point clouds;
wherein the at least one additional group of point clouds comprises a third group of point clouds, a point number of the second group of point clouds being greater than a point number of the third group of point clouds.

18. The computer program product according to claim 17, wherein obtaining the first point cloud based on the input point cloud comprises:
generating a feature value of the input point cloud based on coordinates of the input point cloud;
obtaining a feature value of the first point cloud based on the feature value of the input point cloud; and
generating coordinates of the first point cloud based on the feature value of the first point cloud.

* * * * *